United States Patent Office 2,735,866
Patented Feb. 21, 1956

2,735,866
METHOD FOR PRODUCING GLUCOHEPTONIC ACID AND ITS DERIVATIVES

Louis-Charles Clevenot, Nogent-sur-Marine, France

No Drawing. Application April 15, 1953,
Serial No. 349,106

Claims priority, application France February 18, 1953

3 Claims. (Cl. 260—535)

Glucoheptonic acid the formula of which is $$CH_2OH—(CHOH)_5—CO_2H$$

is used either as an acid or in the form of its salts, for the same purposes as gluconic acid, but it shows, in comparison with the latter, well-known advantages of a higher stability and solubility of its derivatives.

Glucoheptonic acid is generally obtained, in accordance with the method described by Killiani in 1886, said method consisting in causing hydrocyanic acid to act on a solution of glucose. This method, in spite of the endeavours made to improve it, leads always to very small yields and produces, furthermore, highly colored products which it is very difficult to purify.

Now, the object of the present invention is to obtain practically pure or colourless glycoheptonic acid and its derivatives.

We have found that it is possible for this purpose to make oxalic acid react on glucoheptonate of calcium or barium in theoretically accurate proportions. The reaction is performed at room temperature and the separation of the products is made in accordance with the usual methods applied in chemistry.

The solution of glucoheptonic acid obtained may then be concentrated in vacuo to a concentration of 80%. The product obtained is kept in an ice chest and the α lactons which crystallizes may be separated. Glucoheptonic acid in a perfectly pure state thus obtained is a starting product in the preparation of further products that are of considerable interest.

However, in order to obtain such practically pure and colorless glucoheptonic acid or its derivatives, it is necessary to obtain the starting material constituted by glucoheptonate of calcium in a sufficiently pure and colorless state.

To this end, we cause, according to the invention, a solution of glucose to act on a solution of calcium cyanide to which an excess of lime is incorporated for increasing its basic character. This reaction is executed at room temperature through simple admixture of the solutions.

After a predetermined lapse of time, the reaction is ended by driving out the ammonia formed by means of a bubbling of steam through the mixture or else, by boiling in the presence of the atmosphere or in vacuo. This produces a solution of glucoheptonate of calcium in an alkaline phase by reason of the presence of the excess of lime.

If it is desired to obtain a sufficiently high yield of a hardly colored product, it is necessary to operate with sufficiently diluted solutions, whereby the final concentration of calcium glucoheptonate may be equal to 20% or thereabout, and also to operate with a sufficient excess of lime so that the pH of the solution may range between about 9 and 10 and also with an excess of cyanide of about 5% with reference to the theoretically necessary amount corresponding to the glucose submitted to reaction. Furthermore, it is necessary to operate at a temperature that is not too high.

The solution of calcium glucoheptonate thus obtained is then acidified by means of oxalic acid so as to obtain a solution which contains not only glucoheptonic acid but also a large residuum of the precedingly produced calcium glucoheptonate. As a matter of fact, it is of advantage to retain thus about 60 to 70% of untransformed calcium glucoheptonate. There is formed through the addition of oxalic acid an abundant precipitate of calcium oxalate which carries along with it a substantial proportion of the impurities of the solution, chiefly if care has been taken to incorporate to the solution a small percentage of discoloring carbon.

After settling, said acid solution of glucoheptonate of calcium is discolored through filtration by means of active carbon in accordance with conventional methods.

The treatment of the glucoheptonate in an acid phase by means of oxalic acid is an essential step which allows a purification of the product and an almost complete discoloration which is obtained much more easily than if the medium remains alkaline or even neutral.

The suitably discolored solution is then neutralised by the amount of lime required for reaching a pH ranging between about 6.5 and 6.9. This allows obtaining a solution of glucoheptonate of calcium the final concentration of which ranges between about 15 and 20%.

If the original products used at the start are sufficiently pure, the salt obtained is practically pure.

It is possible to obtain glucoheptonate of calcium in a solid state by concentration in vacuo after a last filtration, said concentration being followed by evaporation in vacuo or again it may be dried by treatment with ultra red rays or through atomization.

The solution obtained in accordance with the method that has thus been described, consisting in acidifying glucoheptonate of calcium by means of oxalic acid, may serve either for obtaining glucoheptonic acid in its pure and colorless state and in particular the α lactons which may be used as a selective solvent, or else for producing derivatives of glucoheptonic acid through the conventional methods generally used in chemistry.

For the production of these derivatives of glucoheptonic acid, it is possible to start either from a pure colorless solution of glucoheptonic acid as obtained according to the above method or else from the solid salt extracted therefrom as disclosed. It is thus possible to obtain ferrous glucoheptonate through reaction between the solution of glucoheptonate of calcium and the theoretically accurate amounts of ferrous oxalate or again it is possible to produce glucoheptonate of magnesium through reaction of glucoheptonic acid on magnesium carbonate or on magnesia.

What I claim is:

1. Process for producing glucoheptonic acid consisting in reacting calcium cyanide with a solution of glucose in the presence of a slight excess of lime sufficient for maintaining the pH of the solution at approximately 10 eliminating all ammonia from said solution, and mixing the alkaline solution of calcium glucoheptonate obtained with a weak solution of oxalic acid sufficient for maintaining the pH of the solution at approximately 3.5 to 4.5 forming glucoheptonic acid with a 60 to 70% content of pure and colorless calcium glucoheptonate.

2. Process for producing glucoheptonic acid as claimed in claim 1, wherein a color eliminating carbon is introduced to the calcium glucoheptonate being mixed with the oxalic acid providing a colorless solution.

3. Process for producing solid calcium glucoheptonate consisting in reacting calcium cyanide with a solution of glucose in the presence of a slight excess of lime sufficient for maintaining the pH of the solution at approximately 10 eliminating all ammonia from said solution, and mixing the alkaline solution of calcium glucoheptonate obtained with a weak solution of oxalic acid sufficient for maintaining the pH of the solution at approximately 3.5 to 4.5 forming glucoheptonic acid with a 60 to 70% content of pure and colorless calcium glucoheptonate, neutralizing the resulting acid solution with lime for obtaining a pH between about 6.5 and 6.9 providing a solution of calcium glucoheptonate having a concentration between 15 and 20%, filtering said solution and concentrating the filtrate in vacuo obtaining a pure and colorless solid calcium glucoheptonate.

References Cited in the file of this patent

Hudson et al.: J. A. C. S., vol. 56, pp. 1248–9.